G. W. RHOADS & C. S. SMALL.
LOCK NUT.
APPLICATION FILED SEPT. 10, 1913.

1,140,286.

Patented May 18, 1915.
2 SHEETS—SHEET 1.

Inventors
G. W. Rhoads
and C. S. Small,

By Victor J. Evans
Attorney

Witnesses

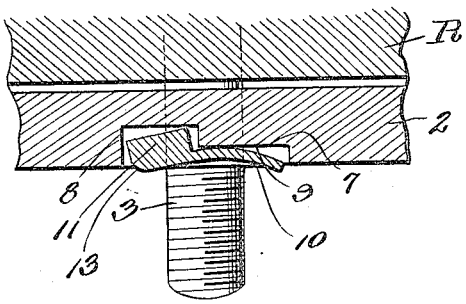
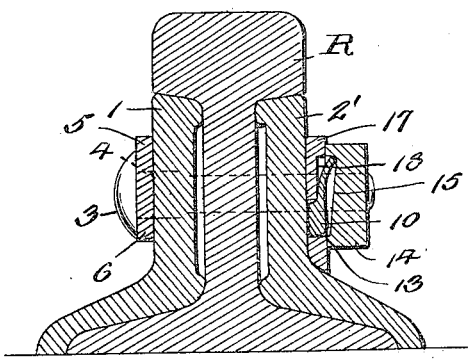
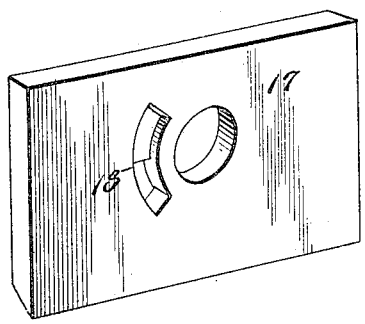
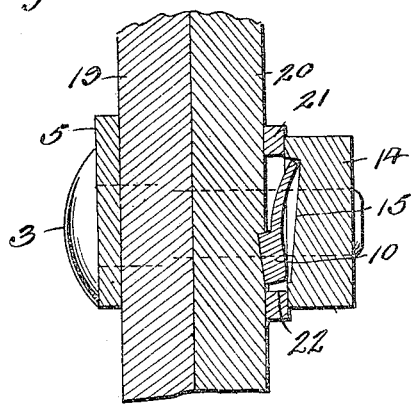
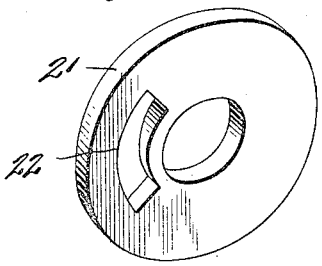

UNITED STATES PATENT OFFICE.

GEORGE W. RHOADS AND CURRY S. SMALL, OF FRANKLIN, PENNSYLVANIA.

LOCK-NUT.

1,140,286.  Specification of Letters Patent.  Patented May 18, 1915.

Application filed September 10, 1913. Serial No. 789,115.

*To all whom it may concern:*

Be it known that we, GEORGE W. RHOADS and CURRY S. SMALL, citizens of the United States, residing at Franklin, in the county of Venango and State of Pennsylvania, have invented new and useful Improvements in Lock-Nuts, of which the following is a specification.

This invention relates to improvements in nut locks.

The object of the invention is to improve the construction of nut locks and to provide a simple, inexpensive and efficient one of great strength and durability, adapted to be applied in connection with an ordinary bolt, and capable of effectively preventing a nut from accidentally unscrewing when subjected to vibration and rattling incident to its use on rail joints, machinery and the like.

Another object of the invention is to provide a nut lock of this character with means for engaging the bolt to prevent the rotation of the bolt, the said means, when removed from the bolt, permitting of the unscrewing of the nut from the bolt.

With the above and other objects in view, the invention consists in the construction and novel arrangement of parts hereinafter fully described, illustrated in the accompanying drawings, and pointed out in the claims hereto appended; it being understood that various changes in form, proportion, size and minor details of construction within the scope of the claims, may be resorted to without departing from the spirit or sacrificing any of the advantages of the invention.

Figure 1:
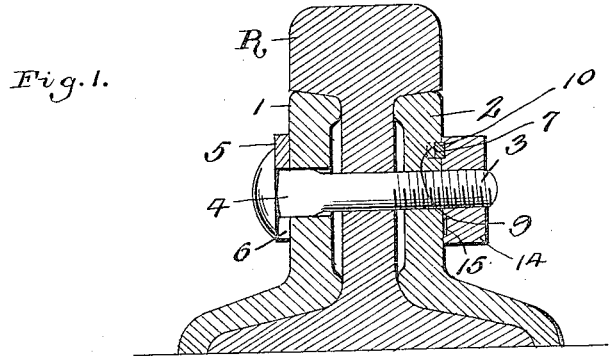
Figure 2:
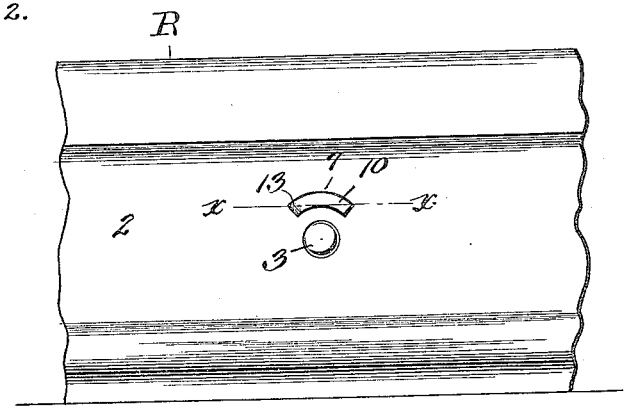
Figure 3:
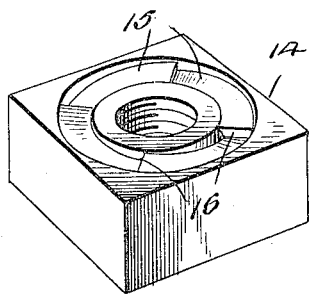
Figure 4:
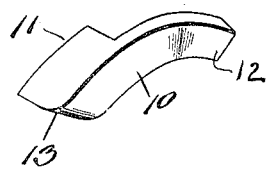

In the drawings: Figure 1 is a longitudinal sectional view of a nut lock constructed in accordance with the present invention, the same being illustrated in connection with a rail and fish plates therefor, Fig. 2 is an elevation, the nut being removed, Fig. 3 is a detail perspective view of the nut, Fig. 4 is a similar view of the escapement dog, Fig. 5 is a longitudinal sectional view on the line x—x of Fig. 2, Fig. 6 is a section similar to that illustrated in Fig. 1, but showing the application of an auxiliary plate which may be employed instead of forming one of the fish plates with a pocket for the dog, Fig. 7 is a perspective view of the auxiliary plate, Fig. 8 is a transverse sectional view illustrating my improvement in connection with two plates which are adapted to be secured together, and Fig. 9 is a perspective view of the washer employed in connection with the device illustrated in Fig. 8.

Like characters of reference designate corresponding parts throughout the several views of the drawings.

In Fig. 1 of the drawings a rail R is shown which is provided with two angular fish plates 1 and 2 respectively, and passing through registering openings and the web of the rail is a bolt 3. The bolt 3 adjacent its head and beyond its threaded shank is formed substantially rectangular, as indicated by the numeral 4, and the numeral 5 designates a plate which is centrally formed with a rectangular opening 6 which communicates with one of its edges and which is adapted to be slid over the rectangular portion 4 of the bolt 3 between its head and the fish plate. The fish plate 2 is provided upon its outer face with a pocket 7, the opposite walls of the said pocket being arranged concentrically of the axis of the shank of the bolt, and the end walls terminate in shoulders which are disposed radially of the said axis. The pocket is of two depths, the greater depth being designated by the numeral 8, and the shallow portion of the pocket being designated by the numeral 9.

The numeral 10 designates a dog which has its longitudinal edges circular to correspond with the opposite walls provided by the pocket, and the said dog has its outer face curved inwardly from its opposite ends. One of the ends of the dog, which may be termed the body of said dog and which is designated by the numeral 11, is adapted to be received within the deep portion 8 of the said pocket 7. The wall of the shallow portion 9 of the pocket at the juncture of the shoulder providing the portion 8 of the said pocket is adapted to serve as a fulcrum for the inner face of the dog at the juncture of the tongue and body, so that normally both of the ends of the dog project beyond the outer face of the fish plate 2. The corner of the dog at the end upon which the body 11 is formed is rounded, as at 13.

14 designates the nut for the bolt 3. This nut is formed upon its inner face with depressions 15, the said depressions being arranged concentrically of the longitudinal axis of the bore of the nut, and gradually increase in depth to provide terminal shoulders 16 which are spaced a sufficient distance apart to permit of the nut, when screwed upon the bolt, riding over the dog to automatically bring the ends of said dog within the depressions to rock the said dog upon its fulcrum to alternately bring its ends to within the depressions and cause its end formed with a tongue 12 to engage with one of the shoulders 16 of one of the said depressions, and so lock the nut against accidental unscrewing from the bolt. When the nut is to be removed from the bolt, the plate 5 is brought out of engagement with the rectangular portion 4 of the bolt, said plate being slid upwardly from between the outer face of the fish plate 1 and the head of the bolt 3, and the headed end of the bolt is forced toward the said fish plate 1 to also force the nut outwardly of the fish plate 2 and bring its shoulders away from engaging position by the dog 10.

In Figs. 6 and 7 we have illustrated a plate which may be employed in lieu of forming one of the fish plates with the pocket 7. The extending threaded shank of the bolt passes through an opening in what I term an auxiliary locking plate 17, the said plate being substantially rectangular and having its lower edge beveled to rest upon the base flange of the fish plate 2' at its juncture with the web, and the said plate 17 is provided with a pocket 18 arranged concentrically of its opening and comprising two depths so that the said pocket is similar in formation to the pocket 7. The remaining portions of the structure are similar to those previously described, the dog 10 being disposed within the pocket 18 and being acted upon by the walls of the depressions and shoulders of the nut 14, in a manner similar to that previously described. It should here be stated that the rounded corner 13 permits of the nut passing over this end of the guard and offers only a slight resiliency (sufficient to rock the dog) when contacted by the nut.

In Fig. 8 we have shown the bolt passing through two plates 19 and 20, the bolt being provided with the plate 5 and having its threaded shank passing through an opening provided in a washer 21. Either the plate which is contacted by the washer is of some soft material such as wood, or both of the said plates may be provided with a concentrically arranged slot which forms a pocket 22 for the reception of the dog 10. In this instance the corner upon the inner face of the dog at the juncture of the body and the shoulder is firmly impressed within the plate 20, and the wall formed by the said depression serves as a fulcrum point for the dog, so that the said dog may be rocked by the bolt, in a manner similar to that previously described.

While the dog is not constructed in view of having its tongue resilient or flexible, the said dog being preferably constructed of metal, the said tongue is afforded a certain amount of resiliency, so that should conditions occur in which the pressure upon the tongue is great enough to cause the bending of said tongue, the same will yield without danger of breakage to the dog, and from the above description, taken in connection with the accompanying drawings, the simplicity of the device, as well as the advantages thereof, will it is thought, be perfectly apparent to those skilled in the art to which such inventions appertain without further detailed description.

In that class of work in which the nut and bolt are to remain permanent fixtures with the plates which they secure, the washer plate 5 is entirely dispensed with, and so it is to be understood that the employment of the said plate is optional, and that the same does not necessarily provide one of the elements of the improvement.

Having thus described the invention, what we claim is:

1. In combination, a plate, a bolt passing through the plate, a pocket provided upon the plate of two depths, a dog comprising a member having its outer face curved inwardly from its ends and including a body and a reduced tongue adapted to be received within the pocket and fulcrumed therein at the juncture of the shallow and deep portion of the pocket to normally permit of both of the ends of the dog projecting beyond the plate, a nut for the bolt, said nut having its inner face formed with spaced depressions which terminate in shoulders, and which are adapted to ride over the dog to rock the dog to alternately bring its ends to within the depressions and to cause one of the ends of the dog to contact with the shoulder of one of said depressions.

2. In combination, a plate, a bolt passing through said plate, a bolt plate arranged between the head of the bolt and the first mentioned plate, a pocket provided upon the said first mentioned plate and being of two depths, a dog comprising a member having its outer face curved from its opposite ends, and including a body having an outer rounded corner and a reduced tongue, the said dog adapted to be received within the pocket and fulcrumed therein at the juncture of the shallow and deep portions of the pocket to permit one of the ends of the dog projecting beyond the plate, a nut for the bolt, said nut having its inner face formed with concentrically arranged spaced depressions which terminate in shoulders, and which are adapted to ride over the dog, when the nut is screwed upon the bolt to rock the dog to alternately bring its ends to within the depressions, and to cause the end provided with the tongue to engage with the shoulder of one of the said depressions.

In testimony whereof we affix our signatures in presence of two witnesses.

GEORGE W. RHOADS.
CURRY S. SMALL.

Witnesses:
RENA L. GEIGER,
P. W. GEIGER.

Copies of this patent may be obtained for five cents each, by addressing the "Commissioner of Patents, Washington, D. C."